Figure 1:
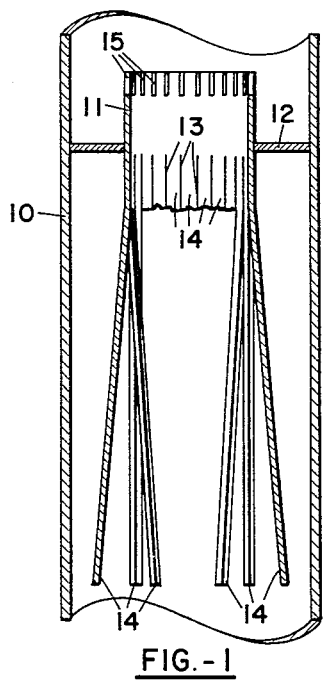

Oct. 31, 1961     J. F. ROSS ET AL     3,006,623

FLUID DISTRIBUTOR FOR PACKED COLUMNS

Filed Dec. 29, 1958

James Francis Ross
Richard Hall Hudson, Jr.    Inventors

By *H. U. Freyer* Attorney 3,006,623
FLUID DISTRIBUTOR FOR PACKED COLUMNS
James Francis Ross and Richard Hall Hudson, Jr., Baton Rouge, La., assignors to Esso Research and Engineering Company, a corporation of Delaware
Filed Dec. 29, 1958, Ser. No. 783,444
2 Claims. (Cl. 261—110)

The present invention relates to fractionation, adsorption, extraction or other forms of packed towers or columns and more particularly to improved liquid distributors for use in packed towers or columns. Where the term distributors is used herein it should be understood that this term includes not only means for initially distributing a liquid to obtain a desired flow pattern in the tower or column but also means for collecting and redistributing liquid one or more times within the tower to reestablish or alter the liquid flow pattern.

It is known that packed towers or columns often suffer the disadvantage of inefficient contacting between downflowing liquid and upflowing liquid vapors and/or gases due to channelling or by-passing occurring in the packing. In packed distillation or adsorption columns it has been found that the descending liquid tends to concentrate at the walls of the column, leaving an insufficient amount near the center of the column, where the gas tends to flow, to obtain good contacting efficiency. The net result is that an increase in the height of packing equivalent to a theoretical plate; i.e., greater height of packing, is required to obtain the desired degree of separation.

Various liquid distributors have been proposed in the past to remove the liquid from the column wall and place it nearer the center of the column. Several styles of distributors are shown, for example, in Perry's "Chemical Engineer's Handbook" and Leva's "Packed Towers and Tower Packing." These redistributors, in general, suffer from one of two defects. They are either complicated and therefore expensive to fabricate or they are relatively inefficient.

It is the object of this invention to provide a novel type of liquid distributor for use in packed columns.

It is also the object of this invention to provide novel liquid distributors for packed columns which are simple and inexpensive to fabricate and install.

It is a further object of this invention to provide distributors for packed columns which will redistribute the liquid efficiently and uniformly throughout the cross-section of the column or in the desired pattern.

These and other objects will appear more clearly from the detailed specification and claims which follow.

In accordance with the present invention, a novel type of distributor, which is equally effective as a reflux distributor or column feed distributor, has been developed which is not only simple in construction and low in cost of manufacture but which furnishes excellent distribution of the liquid in a packed column or tower.

Basically, the liquid distributors in accordance with the present invention comprise a vertical cylindrical piece of pipe or tubing which has been slit from its bottom to the area where the distributor is attached to the interior of the column to form a multiplicity of distribution "fingers." A slot is cut in the top of the piece of pipe or tubing above each of the "fingers" to provide a weir to insure uniform distribution of liquid to each "finger." The "fingers" are bent in a smooth curve so as to have their free ends sufficiently scattered or distributed over the cross-section of the column as to insure that the liquid will be distributed very evenly throughout the cross-section of the column or in the desired pattern.

Figure 2:
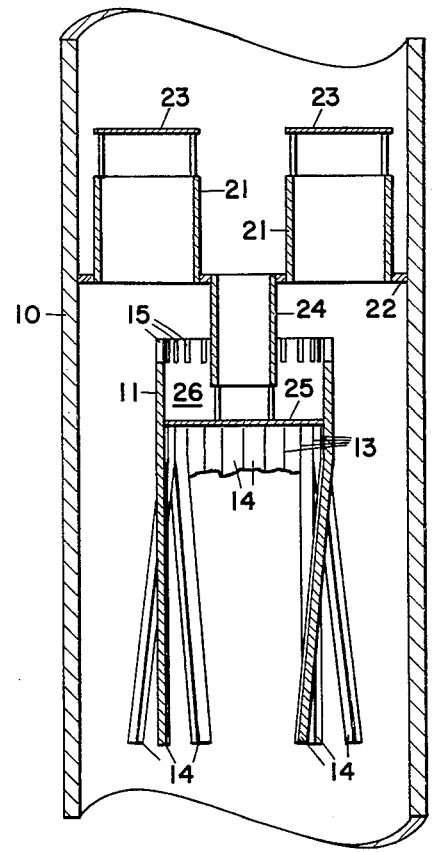
Figure 3:
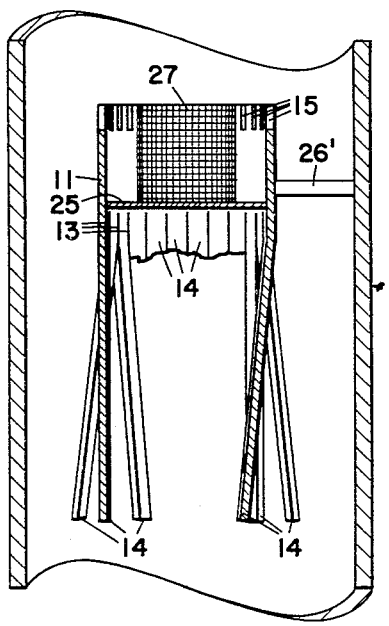

Reference is made to the accompanying drawings illustrating several embodiments of the present invention, FIG. 1 being a cross-section of a liquid distributor particularly suitable for lower gas velocities; FIG. 2 is also a vertical cross-section of a similar distributor which is particularly suited for higher gas velocities and FIG. 3 is a vertical cross-section of a modification of the distributor of FIG. 2.

In FIG. 1, 10 is the wall of the packed column and 11 is one of a plurality of liquid distributors which are arranged in vertically spaced relation. In FIGURES 1, 2 and 3, only one liquid distributor is shown. It will be understood, however, that in larger columns, a plurality of distributors 11 would be arranged in plates 12 for the most efficient liquid distribution and spaced at the desired levels in the column. An annular disc or plate 12 is secured at its outer periphery to the inside of wall 10 and the distributor 11 is suitably secured to the inner periphery of said plate.

The distributor 11 consists of a vertical cylindrical piece of pipe or tubing in which a multiplicity of slits 13 have been cut. Said slits 13 extend from the lower end of the cylindrical piece of pipe or tubing to the general area where the distributor is secured to the plate 12 and divide the lower portion of said piece of pipe or tubing into a multiplicity of long narrow strips or distribution "fingers" 14. Weir slots 15 are cut to a uniform depth in the upper portion of the pipe or tubing above each of the distribution "fingers" 14 thereby insuring uniform flow of liquid to each of the said "fingers." The "fingers" 14 are bent in a smooth curve so that the free ends of the fingers are sufficiently scattered or distributed over the cross-section of the column to insure even distribution of the liquid throughout the cross-section of the column or in the desired pattern. A suitable arrangement in an 8 inch diameter column provided with a 4 inch diameter distributor is to cut sufficient slits in the bottom portion of the cylindrical distributor to form 24 fingers of which 8; i.e., fingers 1, 4, 7, etc., are bent outwardly one inch at the bottom, 8; i.e. fingers 2, 5, 8, etc., remain straight, and 8; i.e., fingers 3, 6, 9, etc. are bent inwardly one inch at the bottom. Other arrangements or patterns for the free ends of the fingers may, of course, be made. The column will, of course, be filled with suitable packing not shown in the drawing in order better to illustrate the distributor of this invention.

In the arrangement shown in FIG. 1, gas at relatively low velocity rises from the bottom of the column and liquid descends from the top. The liquid flowing down over the packing (not shown) from above the distributor is caught on the plate 12, overflows through the weir slots 15 and down the interior of the distributor to the several fingers and thence onto the packing. The gas rises up the center of the distributor countercurrent to the liquid flow.

FIGURE 2 shows an arrangement particularly adapted for high gas velocities where the arrangement of FIG. 1 would be impractical because of entrainment. The cylindrical distributor with the fingers 14 and weir slots 15 is the same as in FIG. 1. In this arrangement the gas travels up the outside of the distributor 11 through risers 21 in plate 22. The number of risers 21 may vary depending upon the size of the column, a desirable arrangement being one in which four risers are arranged 90° apart. A suitable deflector plate is supported above each riser to prevent passage of liquid down the gas riser. The downflowing liquid collects on plate 22 and passes through downcomer 24 into the interior of distributor 11. A plate 25 is provided in the distributor to form a seal pan 26 for the bottom of the downcomer 24. The liquid accumulating in the seal pan 26 overflows through the weir slots 15 onto the exterior of the distributor and thence onto the fingers 14 for uniform distribution over the cross-section of the column. The distributor 11 may conveniently be supported by bolts or rods connected to the downcomer 24 or by extending segments of the downcomer 24 to the plate 25.

Because of the greater flow area between the distributor and the column gas velocity is not excessive and liquid is not entrained from or blown off the "fingers" 14. The risers 21 provide a path for the vapors to by-pass the liquid on plate 22 when the gas velocity rises because of the smaller cross-sectional area. Liquid flows around the risers 21 unhampered by gas, through the downcomer 24 into the seal pan 26.

The plate 22 can also be used as a feed tray by introducing feed anywhere above the plate, since the downcomer serves as a seal to prevent any horizontal liquid gradients from reaching the distributor weir 15. The depth of the seal can be varied as desired by varying the length of the downcomer.

FIGURE 3 shows a simple modification of the FIG. 2 type of distributor which is particularly useful as a reflux or feed distributor. In this embodiment the distributor is secured to the wall 10 of the packed column by any suitable supports. These supports are preferably designed and spaced to give a maximum free area in the annulus between the shell or wall 10 and the distributor. In this embodiment reflux or feed is introduced into the center of the column by a suitable conduit (not shown) immediately above the distributor. A suitable crinkled wire mesh screen or other packing material 27 is arranged within the distributor to absorb the kinetic energy of the incoming reflux. The liquid then overflows through the weir slots 15 onto the exterior of the distributor and thence over the "fingers" 14 onto the packing.

The foregoing description contains a limited number of embodiments of this invention. It will be understood that this invention is not limited thereto since numerous variations are possible without departing from the scope of this invention.

What is claimed is:

1. In a column, improved means for distributing the downflowing liquid which comprises at least one horizontal plate member secured to the inner wall of said column, a plurality of chimney members mounted on said plate for the passage of lighter fluid upwardly therethrough, a downcomer for the downward discharge of liquid accumulating on said plate, a liquid distributor arranged to receive the liquid from said downcomer comprising a vertical cylindrical, thin-walled member, arranged in spaced relation to the inner wall of the column, vertical slits uniformly spaced around the lower portion of said cylindrical member dividing said lower portion of said cylindrical member into a multiplicity of elongated fingers, at least a portion of said fingers being bent in the form of a smooth curve so that the free ends of said fingers are arranged in a suitable pattern to distribute the downflowing liquid in the desired manner directly over the cross-section of the column, slots of uniform depth cut in the top portion of said cylindrical member to provide an overflow weir above each of said fingers, a plate member arranged within the upper part of said cylindrical member below the bottom of said weir slots forming a tray or reservoir of liquid which may thus overflow through said weir slots and thence onto and down the said fingers.

2. The apparatus as defined in claim 1 in which crinkled wire packing is arranged within said reservoir to dissipate the kinetic energy of the liquid entering the reservoir.

References Cited in the file of this patent

UNITED STATES PATENTS

| 1,108,853 | Sewell | Aug. 25, 1914 |
| 1,776,589 | Keith | Sept. 23, 1930 |
| 1,782,735 | MacKenzie | Nov. 25, 1930 |
| 2,042,127 | Sayles | May 26, 1936 |
| 2,639,130 | Heere | May 19, 1953 |
| 2,681,269 | Bergstrom | June 15, 1954 |
| 2,716,024 | Dice | Aug. 23, 1955 |
| 2,856,166 | Goettl | Oct. 14, 1958 |

FOREIGN PATENTS

| 19,668 | Great Britain | Sept. 18, 1908 |
| 365,657 | Great Britain | Jan. 25, 1932 |
| 518,215 | Belgium | Mar. 31, 1953 |
| 627,942 | Germany | Mar. 26, 1936 |
| 726,151 | Great Britain | Mar. 16, 1955 |